United States Patent
Atsmon et al.

(10) Patent No.: US 9,970,774 B2
(45) Date of Patent: May 15, 2018

(54) AUTOMATIC CONTENT ANALYSIS METHOD AND SYSTEM

(71) Applicant: iOnRoad Technologies Ltd., Ramat-Gan (IL)

(72) Inventors: Alon Atsmon, Greenwich, CT (US); Dan Atsmon, Rehovot (IL); Ram Dayan, Tel-Aviv (IL); Hilla Bass, Ramat Gan (IL)

(73) Assignee: iOnRoad Technologies Ltd., Ramat-Gan (IL)

( * ) Notice: Subject to any disclaimer, the term of this patent is extended or adjusted under 35 U.S.C. 154(b) by 283 days.

(21) Appl. No.: 14/791,076

(22) Filed: Jul. 2, 2015

(65) Prior Publication Data
US 2015/0377634 A1    Dec. 31, 2015

Related U.S. Application Data

(63) Continuation of application No. 13/500,409, filed as application No. PCT/IB2010/054538 on Oct. 7, 2010, now Pat. No. 9,076,045.
(Continued)

(51) Int. Cl.
*H04N 9/47* (2006.01)
*G01C 21/32* (2006.01)
(Continued)

(52) U.S. Cl.
CPC ............. *G01C 21/32* (2013.01); *B60W 40/09* (2013.01); *G01C 21/3602* (2013.01);
(Continued)

(58) Field of Classification Search
CPC ...................................................... G01C 21/32
See application file for complete search history.

(56) References Cited

U.S. PATENT DOCUMENTS

| | | | |
|---|---|---|---|
| 5,642,093 A | 6/1997 | Kinoshita et al. | |
| 6,370,475 B1 | 4/2002 | Breed et al. | |

(Continued)

FOREIGN PATENT DOCUMENTS

| | | |
|---|---|---|
| EP | 2249310 A1 | 11/2010 |
| GB | 2340646 A | 2/2000 |

(Continued)

OTHER PUBLICATIONS

Israeli Patent Office, Office Action Issued in Israeli Patent Application No. 229214, dated Nov. 30, 2016, 6 pages.
(Continued)

*Primary Examiner* — Tracy Y Li
(74) *Attorney, Agent, or Firm* — McCoy Russell LLP

(57) ABSTRACT

A method of analyzing images over time is provided herein. The method includes: capturing a plurality of images each associated with specified objects in specified locations such that a specified area is covered; specifying regions of interest (ROI) in each of the captured images; repeating the capturing with at least one of: a different location, a different orientation, and a different timing such that the captured images are associated with the specified covered area; and comparing the captured imaged produced in the capturing with the captured imaged produced in the repeating of the capturing to yield comparison between the captured objects by comparing specified ROI.

20 Claims, 15 Drawing Sheets

Related U.S. Application Data

(60) Provisional application No. 61/347,468, filed on May 24, 2010, provisional application No. 61/333,809, filed on May 12, 2010, provisional application No. 61/330,997, filed on May 4, 2010, provisional application No. 61/329,109, filed on Apr. 29, 2010, provisional application No. 61/286,403, filed on Dec. 15, 2009, provisional application No. 61/249,263, filed on Oct. 7, 2009.

(51) Int. Cl.
| | | |
|---|---|---|
| *G01C 21/36* | (2006.01) | |
| *G06K 9/00* | (2006.01) | |
| *G08G 1/017* | (2006.01) | |
| *G08G 1/0962* | (2006.01) | |
| *G08G 1/16* | (2006.01) | |
| *B60W 40/09* | (2012.01) | |
| *G08G 1/13* | (2006.01) | |
| *G08B 21/06* | (2006.01) | |

(52) U.S. Cl.
CPC ..... *G06K 9/00791* (2013.01); *G06K 9/00805* (2013.01); *G06K 9/00845* (2013.01); *G08G 1/0175* (2013.01); *G08G 1/0962* (2013.01); *G08G 1/09623* (2013.01); *G08G 1/13* (2013.01); *G08G 1/163* (2013.01); *G08G 1/166* (2013.01); *G08G 1/167* (2013.01); *G08G 1/168* (2013.01); *G08B 21/06* (2013.01); *G08G 1/165* (2013.01)

(56) References Cited

U.S. PATENT DOCUMENTS

| | | | |
|---|---|---|---|
| 6,526,335 | B1 | 2/2003 | Treyz et al. |
| 6,570,609 | B1 | 5/2003 | Heien |
| 7,124,027 | B1 | 10/2006 | Ernst, Jr. et al. |
| 7,761,544 | B2 | 7/2010 | Manasseh et al. |
| 2002/0055926 | A1* | 5/2002 | Dan ................. G01C 21/20 |
| 2003/0025793 | A1 | 2/2003 | McMahon |
| 2004/0148090 | A1 | 7/2004 | Melen |
| 2005/0030184 | A1 | 2/2005 | Victor |
| 2005/0096974 | A1 | 5/2005 | Chagoly et al. |
| 2005/0183016 | A1 | 8/2005 | Horiuchi et al. |
| 2006/0103513 | A1 | 5/2006 | Ihara et al. |
| 2006/0220904 | A1 | 10/2006 | Jarlengrip |
| 2006/0255969 | A1 | 11/2006 | Sakakibara |
| 2007/0009137 | A1 | 1/2007 | Miyoshi et al. |
| 2007/0040701 | A1 | 2/2007 | Browne et al. |
| 2007/0055164 | A1 | 3/2007 | Huang et al. |
| 2007/0139182 | A1 | 6/2007 | O'Connor et al. |
| 2007/0204042 | A1 | 8/2007 | Noble |
| 2007/0250901 | A1 | 10/2007 | McIntire et al. |
| 2008/0149798 | A1 | 6/2008 | Tinoco |
| 2008/0162556 | A1 | 7/2008 | McConnell |
| 2008/0167781 | A1 | 7/2008 | Labuhn et al. |
| 2008/0185207 | A1 | 8/2008 | Kondoh |
| 2008/0204256 | A1 | 8/2008 | Omi |
| 2008/0239076 | A1 | 10/2008 | Luo |
| 2008/0243312 | A1 | 10/2008 | Nakamura et al. |
| 2009/0005929 | A1 | 1/2009 | Nakao et al. |
| 2009/0102630 | A1 | 4/2009 | Nordlund |
| 2009/0128311 | A1 | 5/2009 | Nishimura et al. |
| 2009/0128449 | A1* | 5/2009 | Brown ................. G06F 3/012 345/8 |
| 2009/0207045 | A1 | 8/2009 | Jung |
| 2009/0215488 | A1 | 8/2009 | Causey et al. |
| 2009/0222202 | A1 | 9/2009 | Kato |
| 2009/0225189 | A1 | 9/2009 | Morin |
| 2010/0030582 | A1 | 2/2010 | Rippel et al. |
| 2010/0137748 | A1 | 6/2010 | Sone et al. |
| 2010/0157061 | A1 | 6/2010 | Katsman et al. |
| 2010/0245093 | A1 | 9/2010 | Kobetski et al. |
| 2010/0253494 | A1 | 10/2010 | Inoue |
| 2010/0253598 | A1 | 10/2010 | Szczerba et al. |
| 2010/0280751 | A1* | 11/2010 | Breed ................. G08G 1/161 701/414 |
| 2011/0022301 | A1 | 1/2011 | Lee |
| 2011/0143707 | A1 | 6/2011 | Darby, Jr. et al. |
| 2012/0062395 | A1 | 3/2012 | Sonnabend et al. |
| 2012/0194681 | A1 | 8/2012 | Atsmon et al. |
| 2014/0111647 | A1 | 4/2014 | Atsmon et al. |
| 2016/0371551 | A1 | 12/2016 | Atsmon et al. |

FOREIGN PATENT DOCUMENTS

| | | |
|---|---|---|
| WO | 2007138930 A1 | 12/2007 |
| WO | 2009099022 A1 | 8/2009 |
| WO | 2011042876 A1 | 4/2011 |
| WO | 2012150591 A2 | 11/2012 |

OTHER PUBLICATIONS

Israeli Patent Office, Office Action Issued in Israeli Patent Application No. 219115, dated Jan. 9, 2017, 9 pages.
European Patent Office, Summons to Attend Oral Proceedings Pursuant to Rule 115(1) EPC Issued in Application No. 12731740.2, Apr. 3, 2017, Germany, 6 pages.
ISA United States Patent and Trademark Office, International Search Report and Written Opinion Issued in Application No. PCT/IB2010/054538, dated Mar. 10, 2011, WIPO, 9 pages.
International Bureau of WIPO, International Preliminary Report on Patentability Issued in Application No. PCT/IB2010/054538, dated Apr. 11, 2012, WIPO, 7 pages.
Untied States Patent and Trademark Office, Restriction Requirement Issued in U.S. Appl. No. 13/500,409, dated Jul. 3, 2014, 9 pages.
United States Patent and Trademark Office, Office Action Issued in U.S. Appl. No. 13/500,409, dated Oct. 8, 2014, 13 pages.
United States Patent and Trademark Office, Notice of Allowance Issued in U.S. Appl. No. 13/500,409, dated Mar. 2, 2015, 3 pages.
ISA European Patent Office, International Search Report and Written Opinion Issued in Application No. PCT/IL2012/000182, dated Jan. 21, 2013, WIPO, 8 pages.
International Bureau of WIPO, International Preliminary Report on Patentability (Chapter I of the Patent Cooperation Treaty) Issued in Application No. PCT/IL2012/000182, dated Nov. 14, 2013, WIPO, 6 pages.
European Patent Office, Communication pursuant to Article 94(3) EPC Issued in Application No. 12731740.2, dated Sep. 29, 2014, Germany, 3 pages.
United States Patent and Trademark Office, Office Action Issued in U.S. Appl. No. 14/115,302, dated Nov. 4, 2015, 34 pages.
United States Patent and Trademark Office, Notice of Allowance Issued in U.S. Appl. No. 14/115,302, dated May 6, 2016, 14 pages.
United States Patent and Trademark Office, Office Action Issued in U.S. Appl. No. 15/256,389, dated Nov. 14, 2017, 32 pages.
European Patent Office, Partial Supplementary European Search Report Issued in Application No. 10821663.1, dated Nov. 27, 2017, Germany, 6 pages.
European Patent Office, Extended European Search Report Issued in Application No. 10821663.1, dated Feb. 23, 2018, Germany, 16 pages.

* cited by examiner

AUTOMATIC CONTENT ANALYSIS METHOD AND SYSTEM

CROSS REFERENCE TO RELATED APPLICATIONS

This application is a continuation of U.S. Non-Provisional application Ser. No. 13/500,409, entitled "AUTOMATIC CONTENT ANALYSIS METHOD AND SYSTEM," filed Apr. 5, 2015, which is a U.S. national phase application of PCT Application No. PCT/IB2010/054538, entitled "AUTOMATIC CONTENT ANALYSIS METHOD AND SYSTEM," filed Oct. 7, 2010, which claims priority to U.S. Provisional Patent Application Nos. 61/249,263, filed Oct. 7, 2009; 61/286,403, filed Dec. 15, 2009; 61/329,109, filed Apr. 29, 2010; 61/330,997, filed May 4, 2010; 61/333,809, filed May 12, 2010; and 61/347,468, filed May 24, 2010, the entire contents of each of which are hereby incorporated by reference for all purposes.

BACKGROUND

1. Technical Field

The present invention relates to image and video processing and more particularly, to such processing based on time-based changes.

2. Discussion of the Related Art

Using images of scenes taken on different time slots is a well-known method to detect, classify, and analyze changes to the scene or specific objects contained therein. Changes analysis may have further applications that may vary, according to the scope of the time-space that is being monitored.

The introduction of ubiquitous cellular communication devices equipped with imaging capabilities, some with positioning means, poses a challenge for a system and method for controlling these devices in an efficient manner for configuring them for object analysis that is changes based on one hand and has a wide span of applications, on the other hand.

BRIEF SUMMARY

One aspect of the invention provides a method of analyzing images over time. The method includes: capturing a plurality of images each associated with specified objects in specified locations such that a specified area is covered; specifying regions of interest (ROI) in each of the captured images; repeating the capturing with at least one of: a different location, a different orientation, and a different timing such that the captured images are associated with the specified covered area; and comparing the captured imaged produced in the capturing with the captured imaged produced in the repeating of the capturing to yield comparison between the captured objects by comparing specified ROI.

Other aspects of the invention may include a system arranged to execute the aforementioned methods and a computer readable program configured to execute the aforementioned methods. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
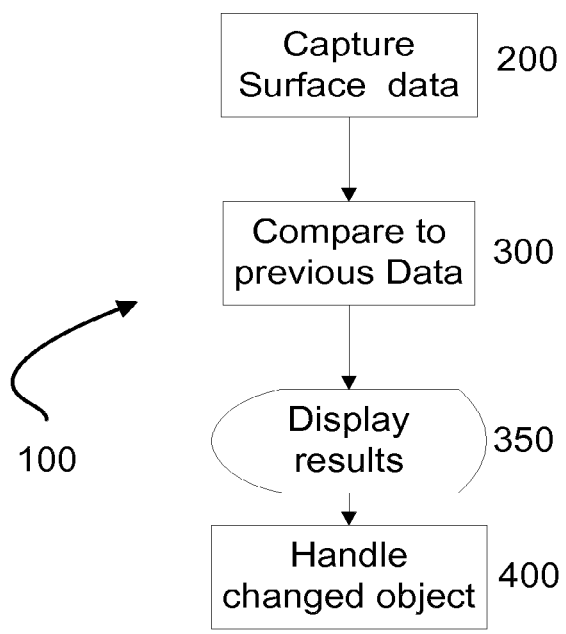
FIG. 1 is a flowchart of acts performed in accordance with an exemplary embodiment of the invention.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

To facilitate understanding the present invention, the following glossary of terms is provided. It is to be noted that terms used in the specification but not included in this glossary are considered as defined according the normal usage of the computer science art, or alternatively according to normal dictionary usage.

The term "DB" as used herein in this application, is defined as database.

The term "GIS" as used herein in this application, is defined as a computer system designed to allow users to collect and/or manage and/or analyze spatially referenced information.

The term "surface objects" as used herein in this application, is defined as objects that are on the surface of a planet such as buildings, roads, canals, fields.

The term "surface data" as used herein in this application is defined as information gathered on surface objects such as aerial images, satellite images, ground images, and images taken with a handheld camera or camera-phone, GIS information, LIDAR data, Radar scans.

The term "image" as used herein in this application is defined as visual representation that can be presented on two dimensional or three dimensional surfaces. Images can be taken in any part of the electromagnetic spectrum such as visible light, infrared, ultraviolet, X-rays, Terahertz, Microwaves, and Radio frequency waves. An Image could be taken from one or more sensors or with one sensors with multiple lenses in order to create a 3 dimensional image.

The term "photo" as used herein in this application is defined as image in the visible light.

The term "DSM" as used herein in this application, is defined as a topographic elevation model of the Earth surface that provides a geometrically representation for overlaying the model with a wide range of GIS data. DSM provides a surface elevation of every natural and artificial feature visible within the image area.

The term "DEM" as used herein in this application, is defined as a digital representation of a continuous variable over a two-dimensional surface by a regular array of z values referenced to a common datum.

The term "DTM" as used herein in this application, is defined as Digital Terrain Model is a 3D representation of the Earth's surface. Its construction includes a height model (DEM) and overlaid with map data relating to features on the surface (Map Data or Aerial Photograph).

The term "INS" as used herein in this application, is defined as a navigation aid that uses a computer, motion sensors (accelerometers) and rotation sensors (gyroscopes) to continuously calculate via dead reckoning the position, orientation, and velocity (direction and speed of movement) of a moving object without the need for external references.

The term "GPS" as used herein in this application, is defined as A system based on satellites that allows a user with a receiver to determine precise coordinates for their location on the earth's surface.

The term "Micronavigation" as used herein in this application, is defined as a method based on visual objects that allows a user to determine precise coordinates for their location on the earth's surface in a precision that is higher than of a GPS system.

The term "Real Time Map" as used herein in this application, is defined Map having layer that are updated in a latency that is lower than the latency needed to benefit from the map considering the changes in the layer. For example, a real time traffic jam map is a map that is updated for at least the last hour as that jams might be gone in an hour.

The term "GPU" as used herein in this application, is defined as an apparatus adapted to reduce the time it takes to produce images on the computer screen by incorporating its own processor and memory, having more than 16 CPU cores, such as GeForce 8800.

The term "Keypoint" as used herein in this application, is defined as interest points in an object. For example, in the SIFT framework, the image is convolved with Gaussian filters at different scales, and then the difference of successive Gaussian-blurred images are taken. Keypoints are then taken as maxima/minima of the Difference of Gaussians. Such keypoint can be calculated for the original image or for a transformation of the original image such as an affine transform of the original images.

The term "Keypoint descriptor" as used herein in this application, is defined as a descriptor of a key point. For example, in the SIFT framework the feature descriptor is computed as a set of orientation histograms on neighborhoods. The orientation histograms are relative to the keypoint orientation and the orientation data comes from the Gaussian image closest in scale to the keypoint's scale. Just like before, the contribution of each pixel is weighted by the gradient magnitude, and by a Gaussian with a 1.5 times the scale of the keypoint. Histograms contain eight bins each, and each descriptor contains an array of four histograms around the keypoint. This leads to a SIFT feature vector with ($4\times4\times8=128$ elements).

The term "Visual content item" as used herein in this application, is defined as an object with visual characteristics such as an image file like BMP, JPG, JPEG, GIF, TIFF, PNG files; a screenshot; a video file like AVI, MPG, MPEG, MOV, WMV, FLV files or a one or more frame of a video.

The term LIDAR as used herein in this application is defined as is an optical remote sensing technology that measures properties of scattered light to find range and/or other information of a distant target. The prevalent method to determine distance to an object or surface is to use laser pulses.

The term "Visual object" as used herein in this application, is defined as a content that includes visual information such as visual content item, images, photos, videos, IR image, magnified image, an image sequence or TV broadcast.

The term "Camera" as used herein in this application is defined as means of capturing a visual object.

The term Terminal as used herein in this application, is defined as an apparatus adapted to show visual content such as a computer, a laptop computer, Mobile phone or a TV.

The term Visual similarity as used herein in this application, is defined as the measure of resemblances between two visual objects that can be comprised of:

The fit between their color distributions such as the correlation between their HSV color histograms;

The fit between their texture;

The fit between their shapes;

The correlation between their edge histograms;

Face similarity;

Methods that include local descriptors and/or keypoints such as SIFT see (en.wikipedia.org/wiki/Scale-invariant_feature_transform), ASIFT, SURF and MSR.

The term "Visual analysis" as used herein in this application, is defined as the analysis of the characteristics of visual objects such, as visual similarity, coherence, hierarchical organization, concept load or density, feature extraction and noise removal.

The term "Sound analysis" as used herein in this application, is defined as the analysis of audio waves such as speech recognition, song recognition, and sentiment recognition The term "Text similarity" as used herein in this application, is defined as Measure the pair-wise similarity of strings. Text similarity can score the overlaps found between two strings based on text matching. Identical strings will have a score of 100% while "car" and "dogs" will have close to zero score. "Nike Air max blue" and Nike Air max red" will have a score which is between the two. Further string similarity metrics are described in http://en.wikipedia.org/wiki/String_metric.

The term "Regular expression" as used herein in this application, is defined as a string that provides a concise and flexible means for identifying strings of text of interest, such as particular characters, words, or patterns of characters. See http://en.wikipedia.org/wiki!Regular_expression.

The term "Text analysis" as used herein in this application, is defined as the analysis of the structural characteristics of text, as text similarity, coherence, hierarchical organization, concept load or density. (See google.com/search?h1=en&safe=off&rlz=1CICHMG_eniL291IL303&q=define:text+analysis&btnG=Search). Text analysis can use regular expressions.

The term "LPR" as used herein in this application, is defined as: license plate recognition as described in en.wikipedia.org/wiki/Automatic_number_plate_recognition.

The term "OCR" as used herein in this application, is defined as the electronic identification and digital encoding of printed or handwritten characters by means of an optical scanner and specialized software.

The term "Symbol analysis" as used herein in this application, is defined as analysis of symbolic data such as: OCR, LPR, hand write recognition, bar-code recognition, and QR code recognition.

The term "Capturing data" as used herein in this application, is defined is data taken while capturing a visual object such as: X-Y-Z coordinates; 3 angles; Manufacturer; Model; Orientation (rotation) top-left; Software; Date and Time; YCbCr Positioning centered; Compression; x-Resolution; y-Resolution; Resolution Unit; Exposure Time; FNumber; Exposure Program; Exif Version; Date and Time (original); Date and Time (digitized); Components Configuration YCbCr—; Compressed Bits per Pixel; Exposure Bias; Max Aperture Value; Metering Mode Pattern; Flash fired or not; Focal Length; Maker Note; Flash Pix Version; Color Space; Pixel X Dimension; Pixel Y Dimension; File Source; Interoperability Index; Interoperability Version; derivatives of the above such as acceleration in the X-axis;

The term "Capturing data analysis" as used herein in this application, is defined as the analysis of capturing data.

The term "Service location" as used herein in this application, is defined as a physical place where objects can be serviced and/or fixed such as a mobile carrier service center.

The term "Location based analysis" as used herein in this application, is defined as analysis of local data such as GPS location, triangulation data, RFID data, and street address. Location data can for example identify the service location or even the specific part of the service location in which the visual object was captured.

The term "Content analysis" as used herein in this application, is defined as the combination of text analysis, visual analysis, symbol analysis, location based analysis, Capturing data analysis, sound analysis and/or analysis of other data such as numerical fields (price range), date fields, logical fields (Female/male), arrays and structures, and analysis history.

The term "Content Match" as used herein in this application, is defined as a numerical value that describes the results of the content analysis that computes the similarity between one or more visual objects, or a logical value that is true in case said similarity is above a certain threshold.

The term "Data Clustering methods" as used herein in this application, is defined as the assignment of objects into groups (called clusters) so that objects from the same cluster are more similar to each other than objects from different clusters. Often similarity is assessed according to a distance measure. See en.wikipedia.org/wiki/Data_clustering.

The term "Driver warning" as used herein in this application, is defined as a warning comprising: audio alert such as a beep sound; a Visual alert such as a red light and/or a text such as: "stop", "slow down", "approaching destination", "pedestrians are crossing", "crossing border"; a Tactile feedback such as vibrations.

The term "Driving intervention" as used herein in this application, is defined as automatic driving operation such as: Braking; Slowing down; Complete stop; Taking a right turn; Taking a left turn; Turning lights on; Tightening the seat belt.

The term "Server reaction" as used herein in this application, is defined as an action performed on a remote server such as sending a message such as an SMS to a specific person or sending a team to a specific location.

The term "System reaction" as used herein in this application, is defined as a driver warning, a driving intervention or server reaction combination of them.

Figure 2:
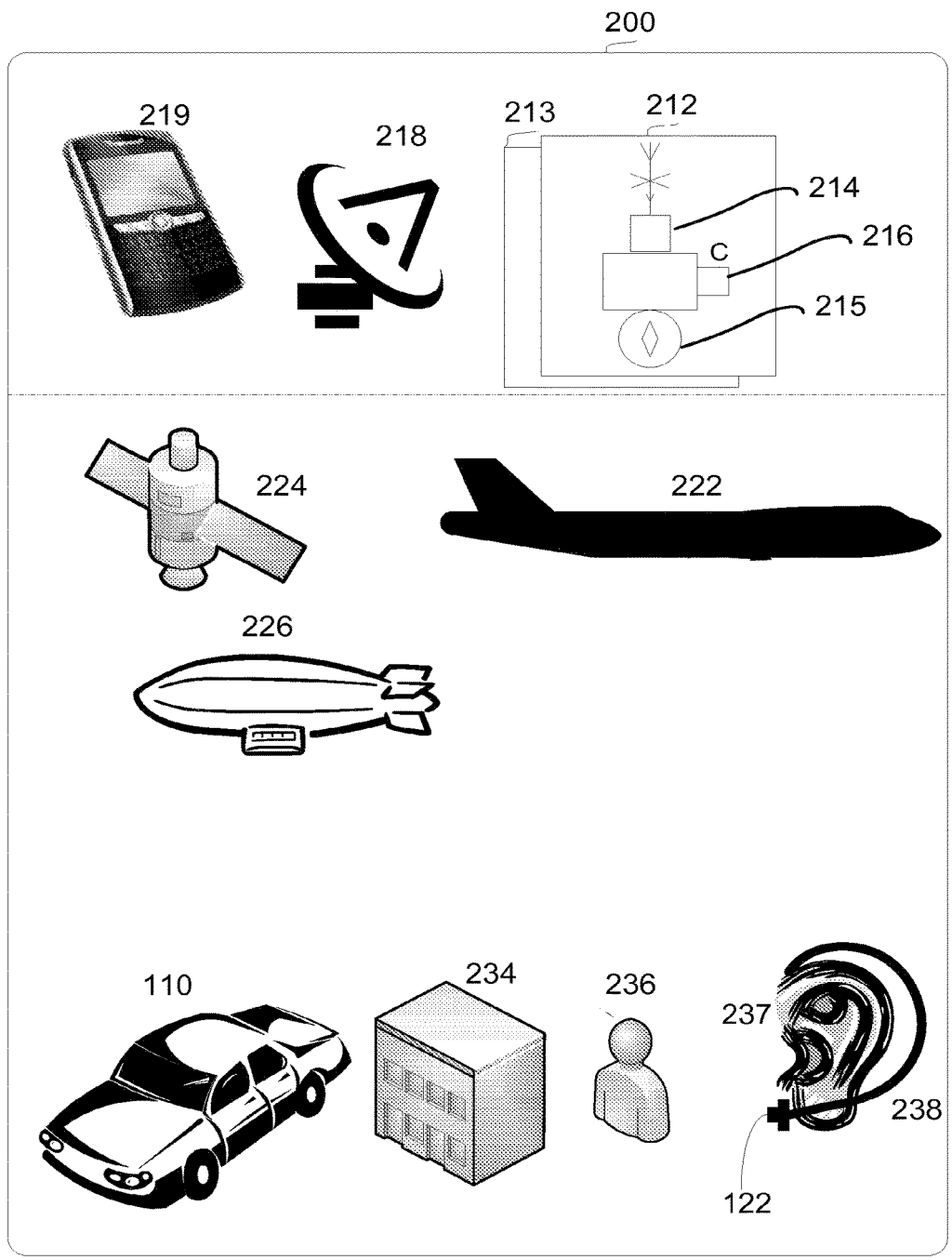
FIG. 2 is a scheme describing the system and process in accordance with an exemplary embodiment of the invention.

FIG. 1 is a flowchart of acts performed in accordance with a n exemplary embodiment of the invention; and System 100 performs the following steps:

Surface data is captured 200 in a manner further described in FIG. 2. Optionally, the Surface data is compared 300 to surface data taken or created at an earlier time. And the difference results are presented 350 as further described in FIG. 3.

In case changes are detected further actions 400 can be taken such as Ordering system 222 such as plane to capture another image of the changed object such as:

1. Taking

Enlarged image Closer image Oblique (diagonal);

An image of different modality than the original one such as IR;

Image in case a visible range image was originally taken; same image to verify the change.

2. Monitor system 200 by reporting an abnormal number of changes.

3. Performing an onsite manned or unmanned inspection of the object from the ground to further check/verify reported changes.

This will be more beneficial in case comparison is taken in "real time" such as time short enough to perform action 400 in the same session such as the same flight session.

FIG. 2 is a scheme describing the system and process in accordance with an exemplary embodiment of the invention. System 200 performs the process of gathering surface data using:

1) A devices such as:

a) A camera system 212 comprising a camera 216 and optionally a GPS 214 and/or INS units 215. It is to be noted that preferably there are similar systems such as 213 capturing data at the same time. In a similar manner there could be further similar system such 218 and/or 219 gathering data at the same time and/or being at the same location and/or gathering data of the same surface object.

b) A LIDAR 218 or RADAR system using pulses of waves to capture data.

c) A mobile camera phone 219, preferably one that resides in an ordinary mobile phone or a navigation system, and preferably one that is able to provide further geo-location data such as GPS or other triangulation data.

2) Airborne Platform to carry said devices such as:

a) An airplane 222;

b) An airship 226;

c) A satellite 224.

3) A surface level platform such as:

a) A vehicle such as car 110 or a motorcycle in which case 219 can be a navigation system placed on the inner part of a car windows and having a camera and preferably captures visual object while moving. Optionally car 110 carries a camera such as 122 close to it front or back license plate. Alternatively, camera 122 is installed on the front and/or back license plate of the car.

b) A building 234;

c) A person 236;

d) A human body part such as ear 237 having an earpiece 238 equipped with camera 122.

Figure 3:
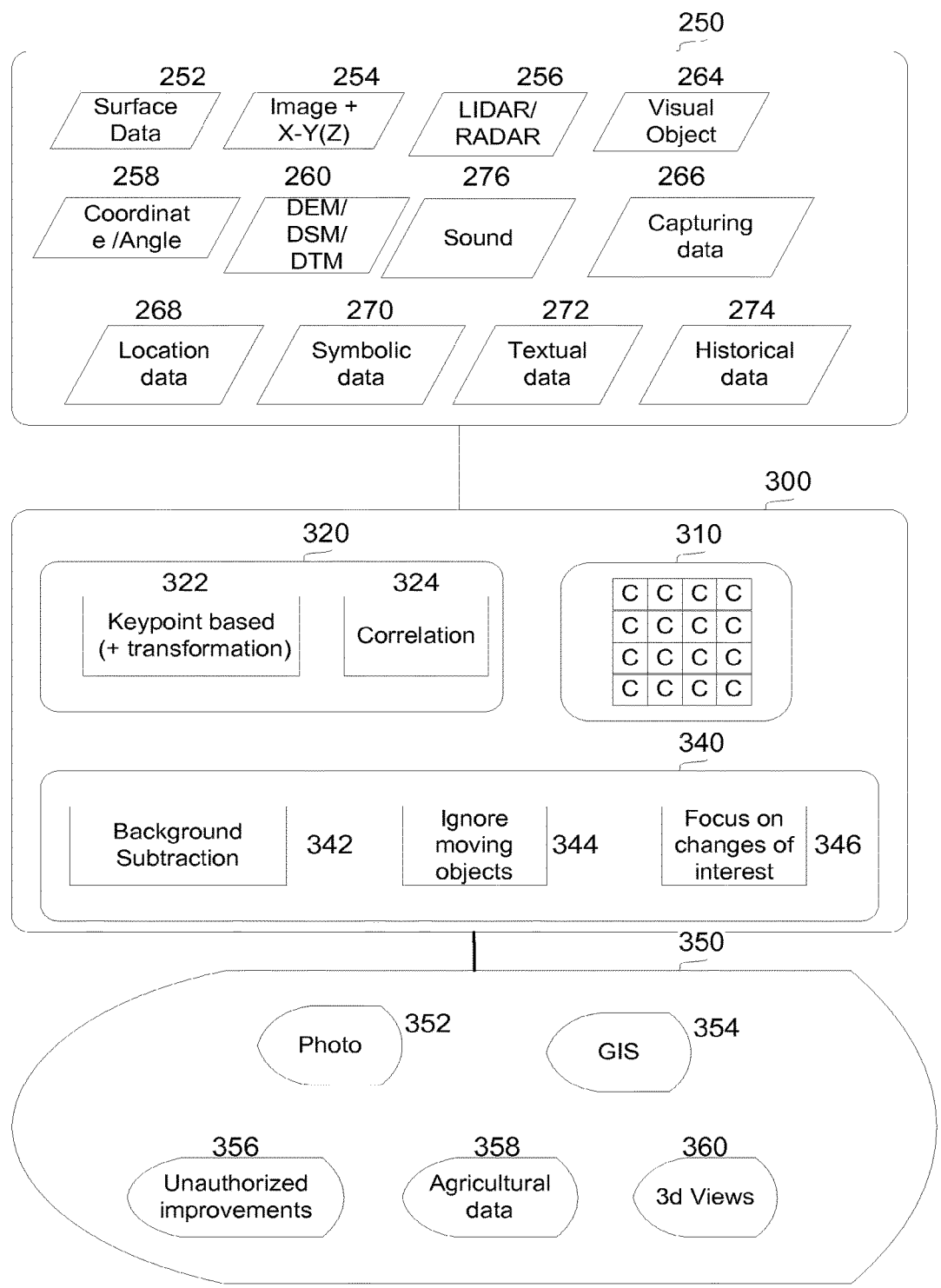
FIG. 3 is a high level block diagram illustrating a data processing and presenting according to some embodiments of the invention.

FIG. 3 is a high level block diagram illustrating a data processing and presenting according to some embodiments of the invention.

The inputs for system 250 are comprised of:

260: DEM and/or DSM and/or DTM collected using systems such as 200;

252: Surface data;

254: images, and preferably models that include images and X-Y-Z/Polar coordinates for each pixel/object in said image;

256: LIDAR or Radar data;

258: GPS and/or INS data such as six dimensional data comprised of latitude, longitude, height, pitch, roll, and yaw.

264: Visual object;

266: Capturing data;

268 Location data;

270: Symbolic data;

272: Textual data;

274: Historical data, such as the last object identified at the same coordinates.

276: sound waves;

Said inputs and historical data of the same location and/or object are processed by subsystem 300. Subsystem 300 is preferable using one or more GPU's 310 as processing of large data sets requires a significant amount of computation and the usage of parallel algorithms such as keypoint descriptors comparison.

System 300 is further comprised of two subsystems:

Subsystem 320 that does content analysis such change detection between two or more data sets such as:

322 keypoint based comparison methods such as SIFT Using methods such as Scale-invariant feature transform or similar methods such as GLOH (Gradient Location and Orientation Histogram), PCA-SIFT and MSR. Such method usually use keypoint localization step, an later on compare many keypoint descriptors in one object to a plurality of keypoint descriptors in another object and hence require quick computation in order to compare an object to a plurality of object within a response time an ordinary user would expect. The higher the number or the percentage of keypoint descriptors in a first object than match (exactly or approximately) keypoint descriptors in a second object the higher is the similarity between the two objects. Preferably, the module uses Keypoints of transformed object based methods. Such transformation can even further use 250 data such as 258 and/or 260 to create estimated needed compensation transform such is there is a 5° deviation between two images of the same building it can correct the resulting keypoint accordingly. Using methods such as Haar wavelet transform. Comparing the color histograms of the object to other color histograms. The methods can be used separately, one after another or in parallel. In case a heavily computational method such as (a) is used it is advisable to use a GPU such as 310 to attain a reasonable response time and to run parallel algorithms.

324 correlation based methods such as 2D correlation.

Subsystem 340 used to filter in the more important changes comprising:

342 Object subtraction modules, used to ignore object such as trees, and water and grass.

344 a module to ignore mobile object such as cars or people using (their calculated speed, size, or the fact they do not reappear in two consecutive images or two image modalities).

346 a module to focus on object of interest such as houses using their visual characteristics (such as shape, color, texture, known patterns, edges).

Subsystem 350 presents the data in a format useful for the intended applications such as:

352: Photo with marked changes from previous photo and preferably digital signature in order to be legally accepted as evidence;

354: GIS output;

356: A report of unauthorized improvements done to objects such as adding a room to a house;

358: agricultural data such growth rate of crops;

360: 3D views such as Urban maps;

Reports as shown in 1240 and 1260.

Figure 4A:
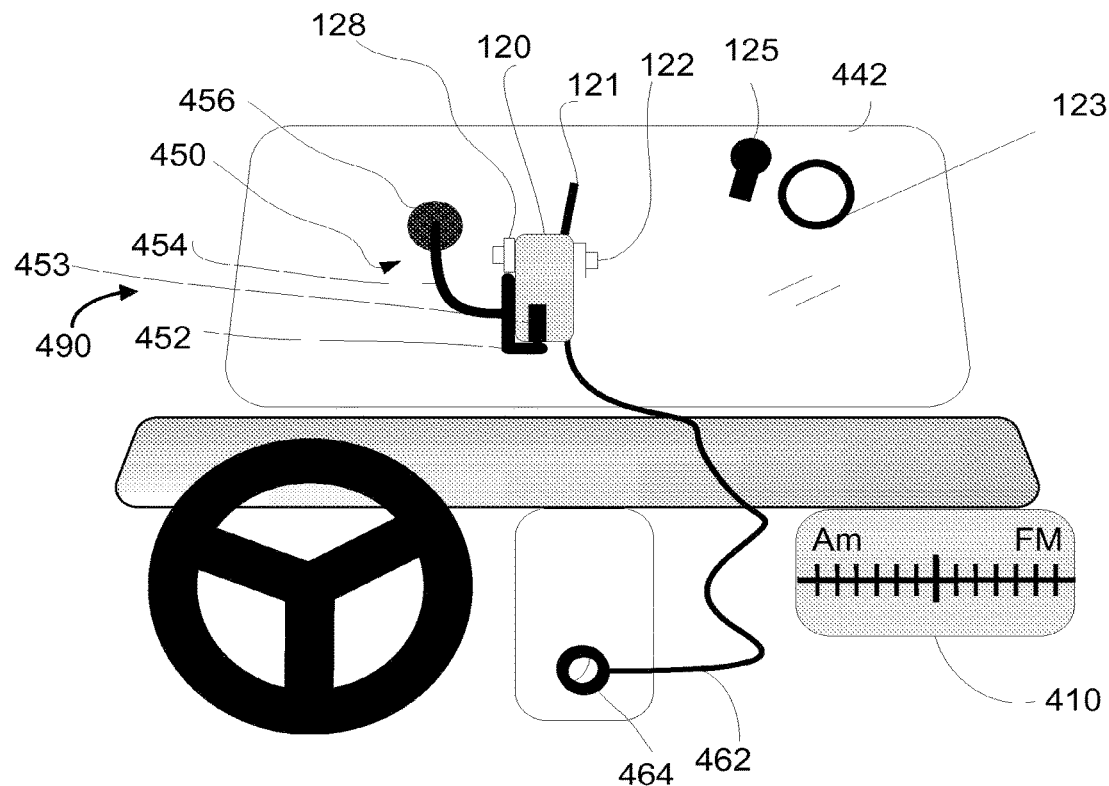
FIG. 4A is a scheme describing a system and process in accordance with an exemplary embodiment of the invention.

FIG. 4A is a front view of a system and process in accordance with an exemplary embodiment of the invention.

System 490 is located on the inner part of a vehicle such as 110. It can be mounted on the front window 442 or the back window 444 of the vehicle. The system is comprised of:

Car mount 450 further comprising of:

Suction cup 456—a device, usually made of rubber or plastic, that sticks to smooth, nonporous surfaces such as 442. This device can be replaced by an adhesive unit.

Arm 454 attached to both 456 and 452. Sometimes arm 454 is flexible.

A cradle 452 that can grip a device such 120. Cradle is adapted to enable repeated quick and repeatable mounting and un-mounting (for example in less than 5 seconds), for example by using side holders 453 that grab device 120 from its left and right side. In some cases, one of the corners of cradle 452 is eliminated or cut to clear line of sight for camera 122 and/or 128.

Device 120 is a device having a processing unit, such as a smart-phone such as an iPhone device. Sometimes device 120 is mobile and sometimes it is stationary. Sometimes device 120 has multiple cores (such as a graphic card) that enable executing parallel algorithms. Sometimes device 120 has an internal and/or external antenna such as 121. Antenna 121 can wirelessly connect the device to a public network such the Internet and thus transmit the information gathered by device to a remote server and/or to other users such as other users of a device such as 120 and thereby share that information.

Device 120 can have one back side camera such as 122 or additional camera such as 128. Sometimes device 120 runs a second application such as a Navigation application in parallel to performing the process of FIG. 5. Sometimes though, camera is actively capturing images, device 120 is adapted not to display the captured image.

Sometimes Device 120 uses means for receiving power such as cable 462 that connects to the a car lighter socket such as 464.

Device 410 is a media player such as car radio.

Figure 4B:
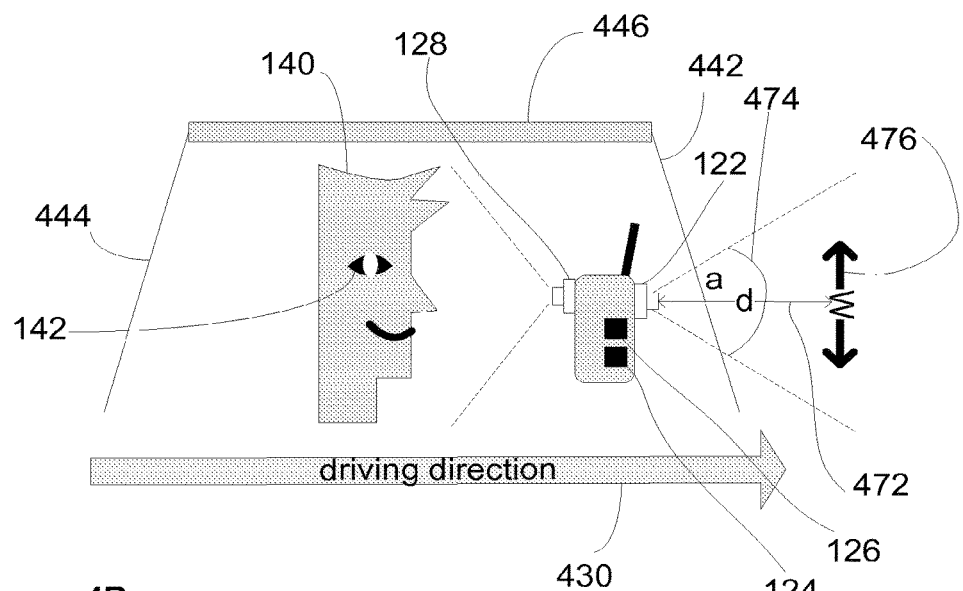
FIG. 4B is a side view of a system and process in accordance with an exemplary embodiment of the invention described in 4A.

FIG. 4B is a side view of a system and process in accordance with an exemplary embodiment of the invention described in 4A

The vehicle's driving direction is defined in 430.

The vehicle has a front window 442, a back window 444, and a roof 446.

The vehicle is driven by driver 140, drivers eye is marked 142.

Sometimes device 120 has additional sensors 124,126, these sensors can be:
  Microphone;
  Accelerometer;
  Compass;
  GPS or AGPS receiver;
  Magnetic sensors;
  Proximity sensor;
  Capacitive sensors;
  Finger print sensor;
  Chemical sensor;
  Machine olfaction sensor;
  CO2 sensor;
  Bio-sensors;
  A sensor matrix of any of the above;
  Temperature sensor either one that requires contact with the measured medium or one capable of remote measurement of temperature.

For example, a microphone can be used to capture sound waves indicating a car problem.

In another example motion sensor 124 and/or camera 128 can be used as a car theft alarm, hence in case the car is moved while its owners are out of the car, it will produce an alarm sound and/or call and/or SMS its owner and or the police.

A front camera such as 128 can capture a visual object, and its analysis can indicate driver 140 has fallen asleep as his eye leads have been closed for a period longer than a predefined threshold.

Device 120 can also receive data from a remote server indicating such as triangulation data indicative of its location and/or estimated speed.

Figure 6:
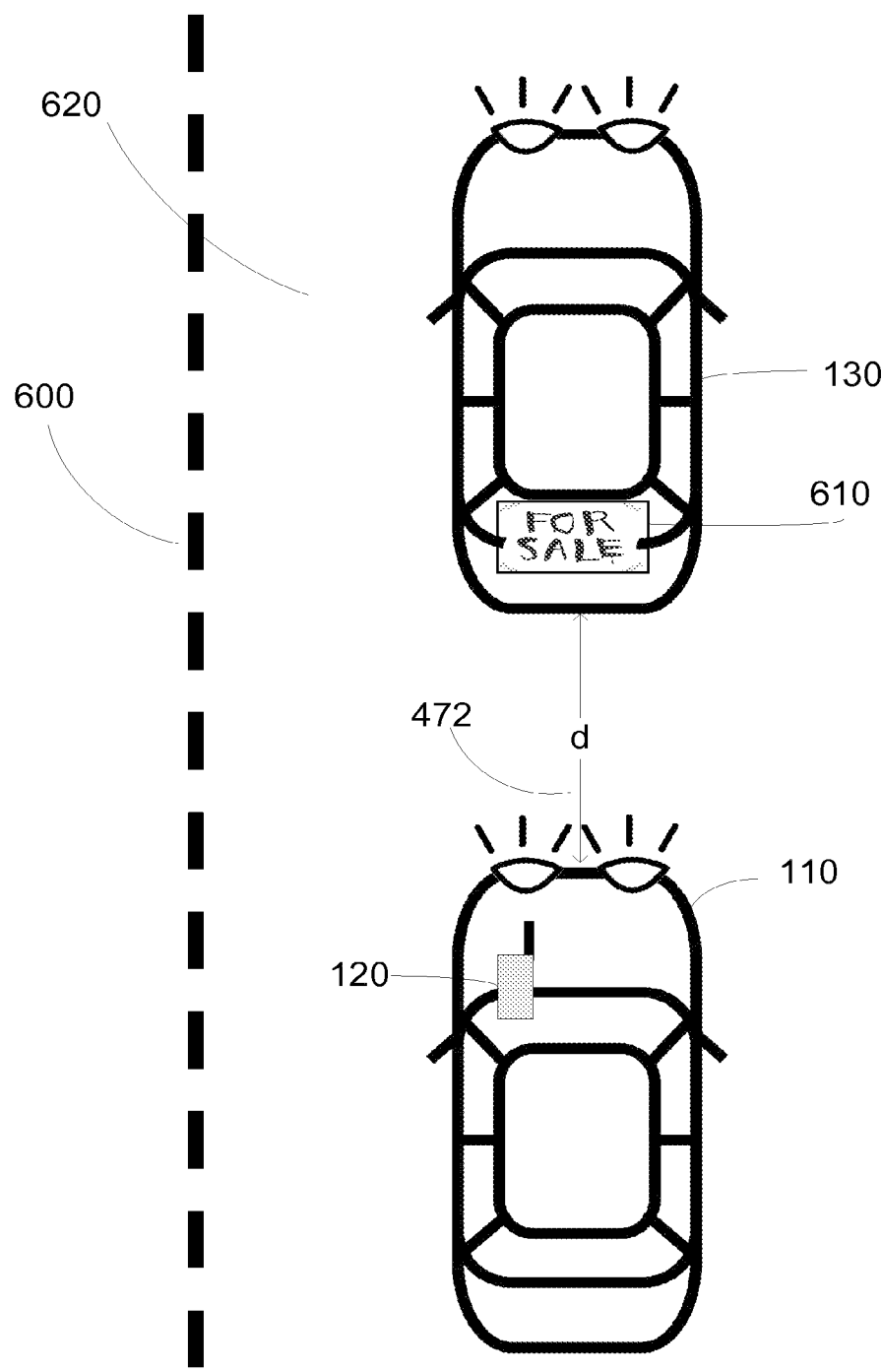
FIG. 6 is a scheme describing a system and process in accordance with an exemplary embodiment of the invention.

Camera 122 can be used to estimate the distanced 472 between 120 and another object such as 130 of FIG. 6. Distance d can be estimated using the formula:

$$d = S*Wmax/(2W*\tan(a/2)$$

where:

474 a=the angular extent of a given scene that is imaged by camera 122.

S=the known width of object such as object 130 in metric units

476 W=the width of object such as object 130 in pixel units

Wmax=the maximal width of an object in pixel units in camera 122

Figure 5:
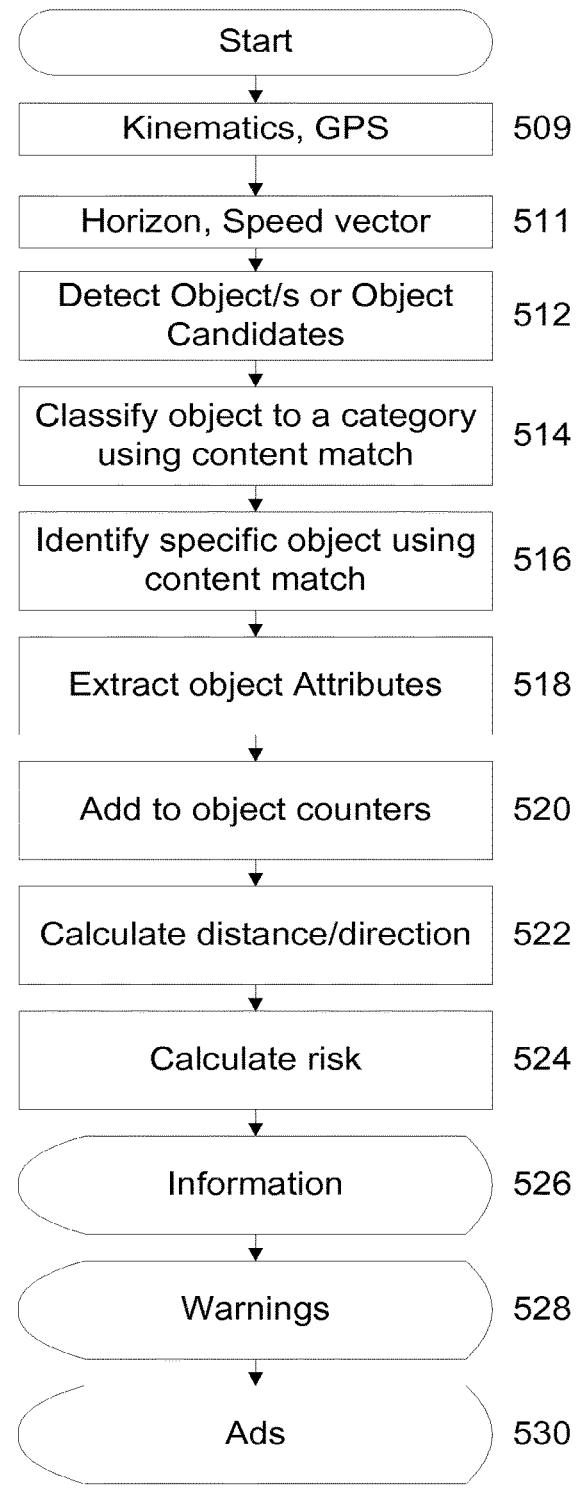
FIG. 5 is a flowchart of acts performed in accordance with an exemplary embodiment of the invention.

FIG. 5 is a flowchart of acts performed in accordance with an exemplary embodiment of the invention.

The acts serve the content matching needed in the embodiments described in figures such as 4, 6, 7, 8, 9, 10, 11.

One of the inputs for the process is a visual object such as a photo frame captured by camera 122. Others are for example sensors 124,126 input and other data as shown in 250 Processing can be performed on device 120 or on a remotes servers.

The following acts are performed, not necessarily in the below order:

509—Receive location data such as GPS, AGPS, Cellular triangulation data and/or sensor 124,126 data such as acceleration, and camera 122,128 data and time.

511—Use the above data to compute the speed in which 110 is traveling (both magnitude and direction in 3 axes. For example, two GPS points and in two time points give the average velocity. Speed can also be calculated using the camera data. Angular data from sensors data can give the estimated horizon point. The horizon can be calculated using the camera data as well. Other possible computations are:

Tilt—both to the side (around Z axis) and to the front (around Y axis), calculated from the orientation sensor values.

Horizon Line—calculated from the tilt of the device around its Y-axis and translated to pixel Y-coordinate according to the screen resolution.

Bearing line—though it can be calibrated manually by the user dragging the vertical bearing line. A few automatic methods are possible:

Calculating the angle between the compass azimuth and the GPS-based bearing azimuth;

Calculating the angle between the phone screen and the car's windshield based on the average forces working on the phone (from the accelerometer sensor);

Calculating the driving direction using pattern recognition of the street lane lines.

512—An object is detected, for example a car such as 130.

514—The object is classified to a category, for example a car, a motorcycle or a person.

516—A specific object is identified, such as the car from previous frame, or a person called John Smith.

518—Specific object attributes are extracted such as:
  Car color;
  Texture;
  Shape;
  License plate numbers;
  Hair color;
  Object dimension such car's width, persons height.

520—object can be counted such as counting the number of cars on the road, or the number of shoppers 834 near store 832.

522—distance and or direction is calculated to the object such as:
  The distance from 122 as shown if FIG. 4B
  the direction to the object such as the angular direction
  The relative speed from the object.
  The time to collision with the object

524—The risk of collision is calculated taking in account:
  The device 120's speed using parameters such as GPS and devices sensors such as 124;
  Estimated time to collision;
  Road conditions;
  Car condition;
  Visibility;
  Drivers conditions such as estimated reaction time;
  Sensor information from 124,126;
  Device 120 or devices connected to it can than show to user such as driver 140 and/or other users in vehicle 110 information such as:

526: object information such as any of the attributes described in 518;

528: warning such as driver warning or advice such a suggestion to change a lane using GIS info such as 1240 such as traffic flow information;

530: advertisements such as sales in store 834. Sometimes ads are local ads of businesses close to 120.

The advertisements are optionally directed at inducing, promoting and/or encouraging purchase of products and/or services and/or acceptance of ideas. Optionally, the user to which the advertisements are displayed is not charged for display of the advertisements, but rather the provider of the advertisements is charged for their display. In some cases, the advertisement is an audio sound such as a radio advertisement. Sometimes the advertisements are displayed only when device 120 indicates the car 110 is slow, in complete stop or in a traffic jam Steps 512, 514, 516, 518 can all use Content analysis and content match.

Some of the steps 512-530 are optional.

FIG. 6 is a scheme describing a system and process in accordance with an exemplary embodiment of the invention.

Scheme shows a first, lead vehicle 130 traveling along a road 620 and followed by a second vehicle 110 having device 120.

Driver 140 is driving the second vehicle 110. System 490 processes images of the environment in front of the second vehicle 110 and produces information out of them.

Using this information system 490 calculates distance (d) 472 between two vehicles 110, 130 and speed of second vehicle 110 at any given time as further described in FIG. 5.

According to these parameters system 490 then processes images taken by camera 122 and estimates the risk of collision between the two vehicles for example by comparing the estimated time to collision and the time to collision threshold. The risk to collision can take in account the breaking time, the cars relative distance, velocity, acceleration and jolt. Road conditions such as wet road (such as 826), oil spills, and the presence of other car, and drivers 140 expected reaction time due to his fatigue and his reaction time history.

If such an estimated risk crosses a predefined threshold and/or vehicle 110 speeds exceeds permissible, system reaction will occur.

Optionally, system 490 can extract further attributes of vehicle 130. such as a for sale sign 610, vehicle 130's car model, color, size, condition If such a vehicle is identified, system 490 produces a relevant notice such as an alert for potential vehicles for sale within range.

These alerts are also accessible to all system's 490 users via web.

Optionally, system 490 creates a system reaction in case the distance between 110 and 130 and/or the estimated time to collision is below a certain threshold.

Alternatively, 130 is behind car 110 and system 490 creates a system reaction in case the distance between 110 and 130 and/or the estimated time to collision is below a certain threshold. The system reaction can be displayed on the backside such as through the back window 444 of 110 using a back window sign.

Figure 7:
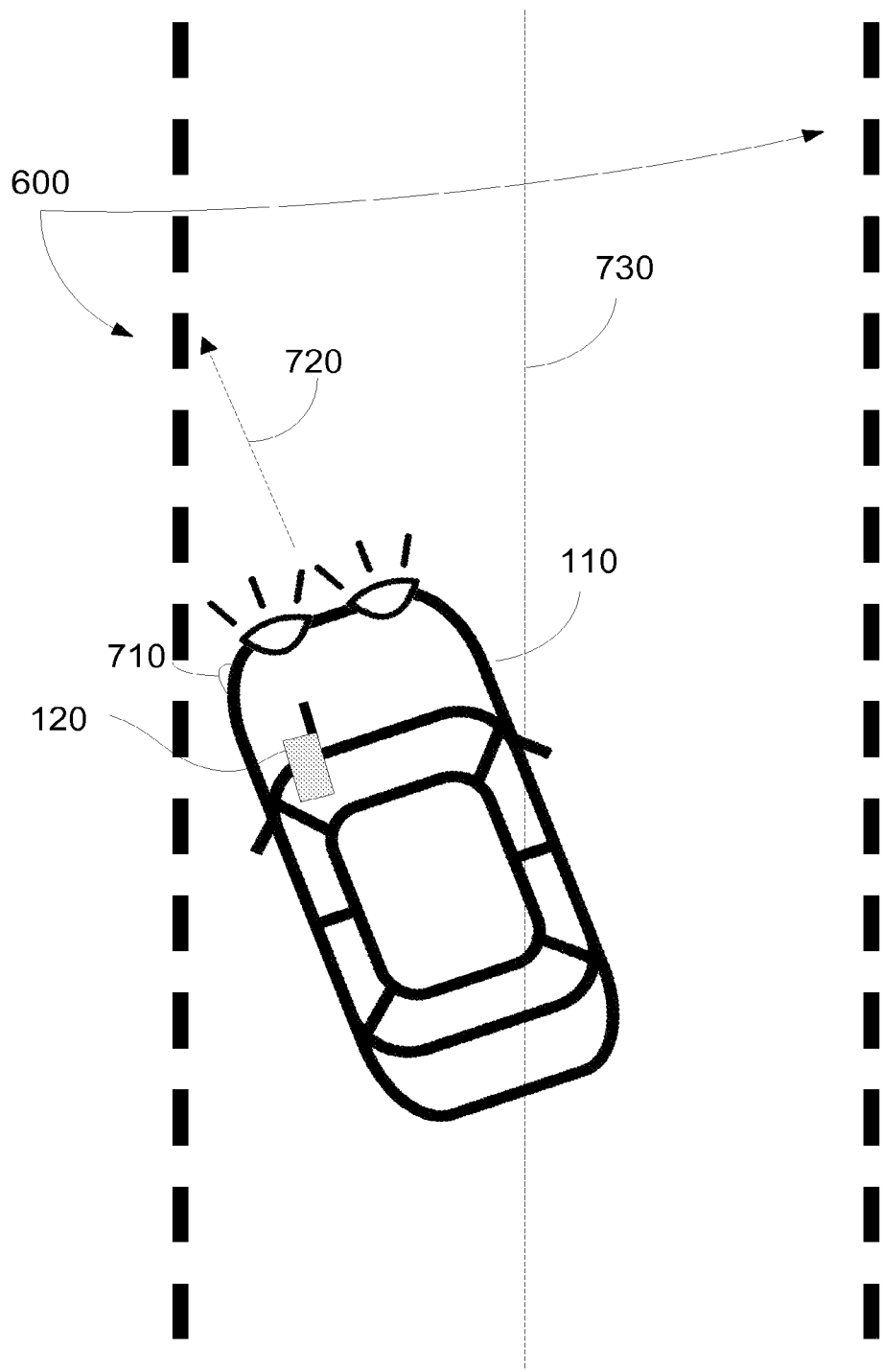
FIG. 7 is a scheme describing a system and process in accordance with an exemplary embodiment of the invention.

FIG. 7 is a scheme describing a system and process in accordance with an exemplary embodiment of the invention.

Person 140 drives his vehicle 110 having device 120. He is supposed to drive in accordance with lane markings 600.

Nevertheless, during driving, person 140 is falling asleep or not paying attention.

Consequently, vehicle driving direction 720 deviates beyond a certain threshold from the middle of the lane markings 730 and even crosses the left marking.

System 490 process images taken by camera 122 and recognizes using steps such as the ones described in FIG. 5, the deviation from the middle of the lane. If such a deviation crosses a predefined threshold system 490 reaction will occur.

Optionally, system 490 will use the input from camera 122 and/or microphone 124 to check whether the driver has used the left turn blinker 710 in which case no alert will be created.

Figure 8:
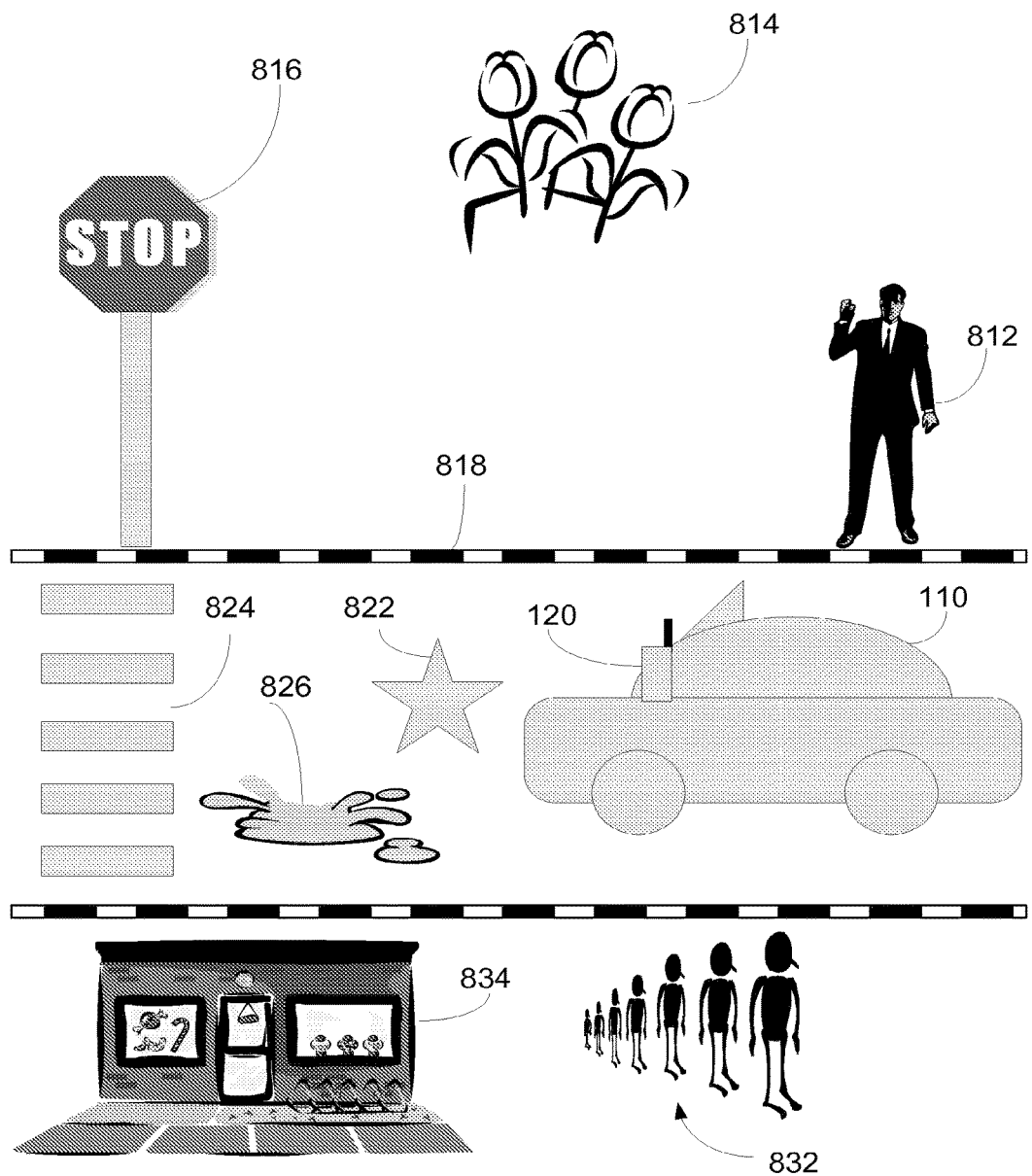
FIG. 8 is a scheme describing a system and process in accordance with an exemplary embodiment of the invention.

FIG. 8 is a scheme describing a system and process in accordance with an exemplary embodiment of the invention.

Scheme shows a vehicle/taxi 110 traveling along a road 620.

System 490 processes images taken by camera 122, 128 of the environment in front of the taxi 110 having device 120, and produces information and data regarding items within driving range, such as:

People waiting for a taxi 812 optionally in a real time map;

Pavement stone 818;

Shops and businesses 834 and their relevant traction;

Road conditions such as bump 822 or wet road 826;

Traffic signs above the road level such as stop sign 816, or on the road level such as zebra crossing 824;

Landscape conditions such as blossoming field 814;

Crowd 832, and his emotions, using features such as smile recognition or by analyzing the sound of the crowd;

Police cars, police man, traps, laser gun;

Traffic lights color;

Traffic jams;

Low visibility;

Traffic offenders and license plate recognition;

Measure street cleanness level, report is sent to municipalities;

Water leaks, report is sent.

System 490 uses OCR technology to read and interpret traffic signs above the road level; this is relevant to driving abroad. For example, Driver 140 is driving in a foreign country. Traffic and information signs are written in a foreign language, which he does not understand. System 490 will recognize signs above road level, translate and alert driver 140 regarding relevant information.

Another example is, taxi driving along a road. System 490 recognizes people at the side of the road raising their hand for a taxi, System 490 then produces relevant notice, available to all system's users via web.

Yet, another example is a car is driving along a road, a person face is captured and is compared against a person DB, for example:

Celebrity Faces DB in which case a system reaction is created such as sending a message that the celebrity was seen on a certain location using twitter.com of Facebook.com.

Abducted children DB in which case a message will be sent to local police.

A person category DB of police or soldier uniforms.

Figure 9:
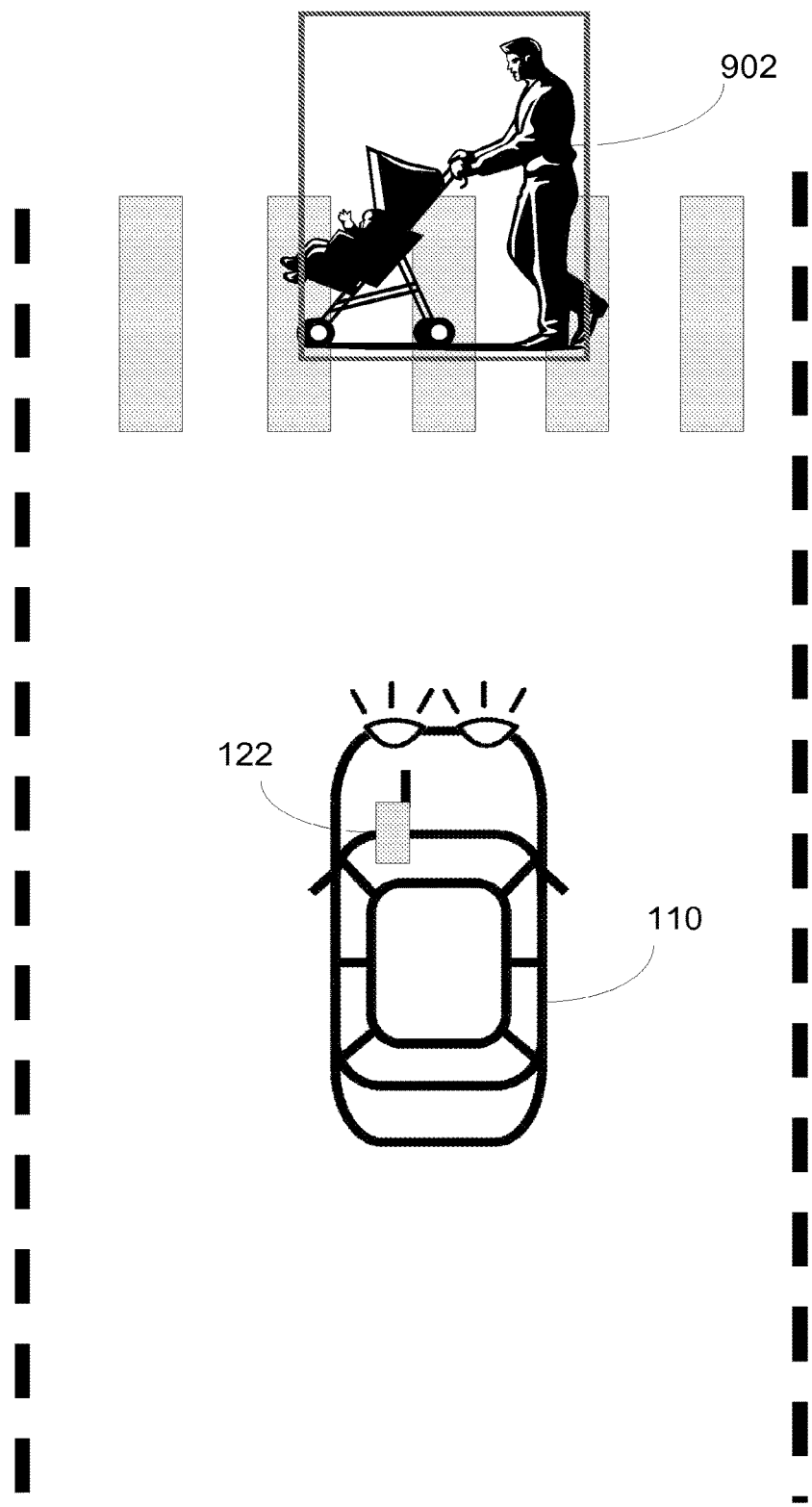
FIG. 9 is a scheme describing a system and process in accordance with an exemplary embodiment of the invention.

FIG. 9 is a scheme describing a system and process in accordance with an exemplary embodiment of the invention.

Person 140 drives his vehicle 110.

He is driving towards a pedestrian 902 who is crossing the road. Person 140 is falling asleep or not paying attention to the road.

As a result, he doesn't notice pedestrian 902 crossing the road. System 490 processes images taken by camera 122 and estimates distance from and/or the relative speed to pedestrian 902 and the estimated risk for an accident. If such a risk crosses a predefined threshold system reaction will occur.

Figure 10:
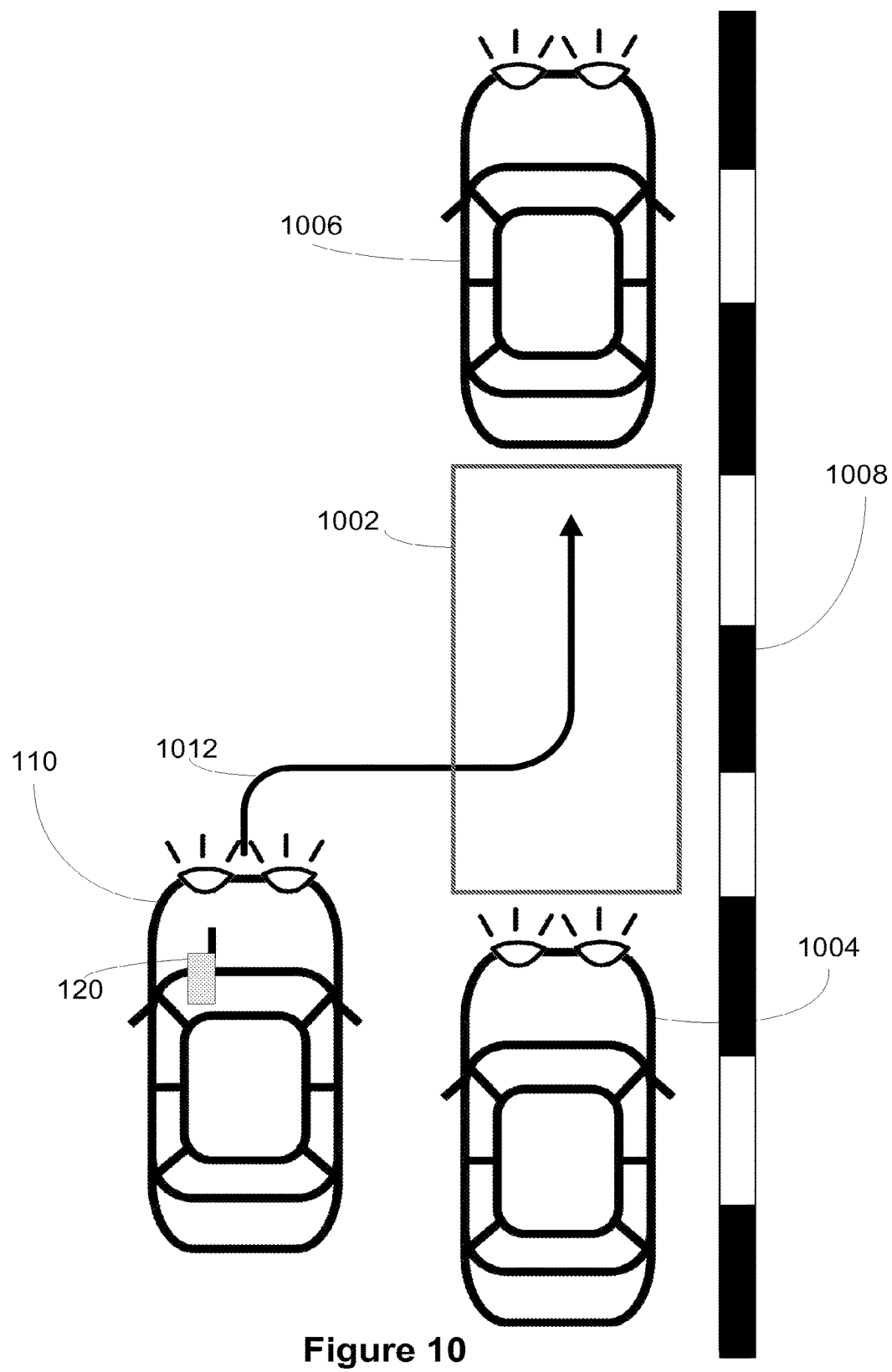
FIG. 10 is a scheme describing a system and process in accordance with an exemplary embodiment of the invention.

FIG. 10 is a scheme describing a system and process in accordance with an exemplary embodiment of the invention.

Scheme shows a vehicle 110 having device 120 and traveling along a road 620. Driver 140 is driving his vehicle 110 and is seeking for a parking spot.

System 490 processes images of the environment surrounding vehicle 110, and produces information out of them.

From this information system 490 identifies available parking spots and alerts driver 140 when one is detected 1002. For example pavement stones marking an allowed parking place such as 1008 with that are not taken by cars such as 1006 and 1004 and with a length that is above a predefined length.

These alerts are also accessible to all system's 490 users within suitable range via web.

Driver 140 then reaches parking spot 1002, between two parking vehicles 1004, 1006 and tries to park his vehicle 110.

System 490 processes images taken by cameras 122,128 and accordingly calculates parking route 1012, then system 490 reaction will occur in order to guide driver 140 into parking spot 1002.

Figure 11:
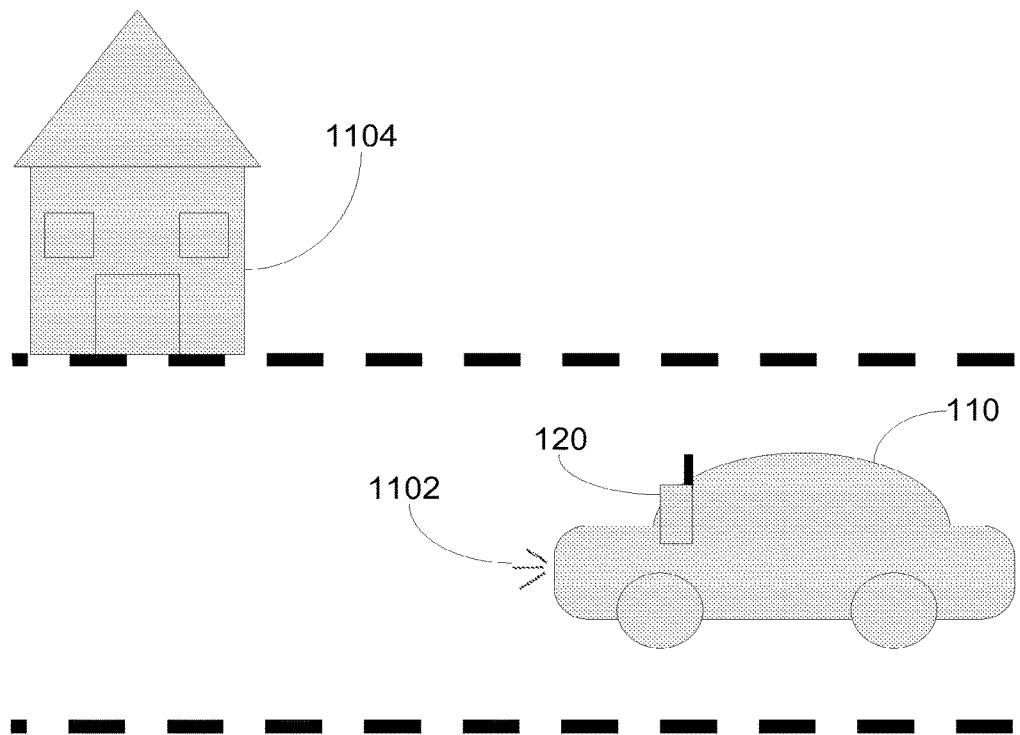
FIG. 11 is a scheme describing a system and process in accordance with an exemplary embodiment of the invention.

FIG. 11 is a scheme describing a system and process in accordance with an exemplary embodiment of the invention.

Scheme shows a vehicle 110 traveling along a road 620. System 490 processes images of the environment in front of the vehicle 110 and recognizes whether it's a day or a night driving. In case of night driving system 490 checks whether vehicle lights 1102 are turned on. If lights 1102 are off, system 490 preforms a reaction.

Moreover, system 490 recognizes whether vehicle 110 has reached its destination 1104 using Micronavigation for example by comparing the input received by 120 to the known images of taken before on that coordinates. In case of destination arrival system produces relevant notice. Micronavigation can be also used to navigate person 236 to a specific shelf in store 834. Or to assist a driver in navigation such as telling him to change lanes or take a turn.

Figure 12:
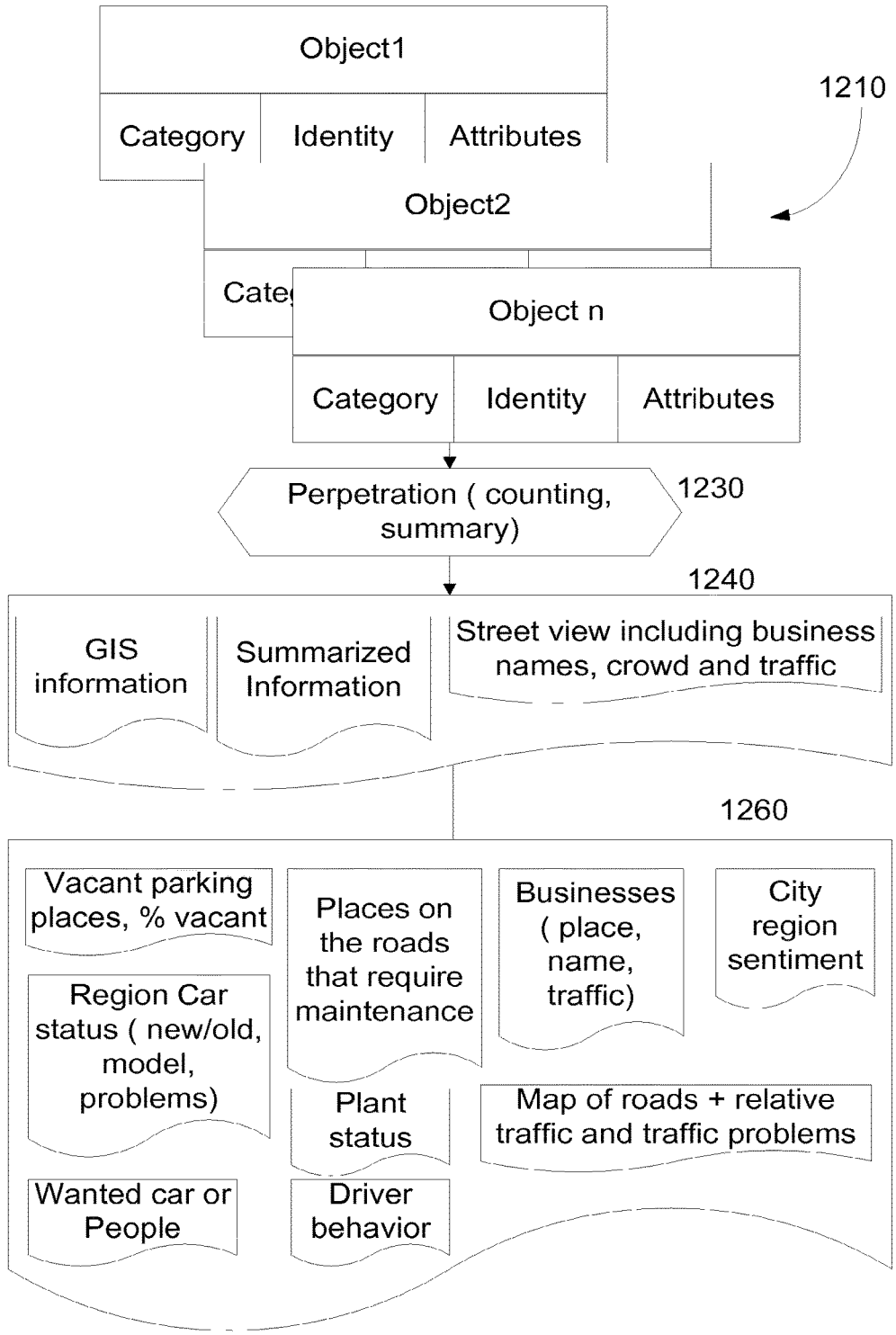
FIG. 12 is a scheme describing a system and process in accordance with an exemplary embodiment of the invention.

FIG. 12 is a scheme describing a system and process in accordance with an exemplary embodiment of the invention.

Information is collected using the act described in figure five using one or more systems such as 490 on one or more objects 1210. Optionally for each object its category 514 and attributes 518 are extracted. Object of the same of similar coordinates and or attributes can be counted 1230 in order to analyze the data. Preparation 1230 is sometimes the preparation such as 1240.

The reports of 1240 can be of several categories such as: GIS information reports, Summarized information and street view including business names, crowd and traffic.

Figure 13:
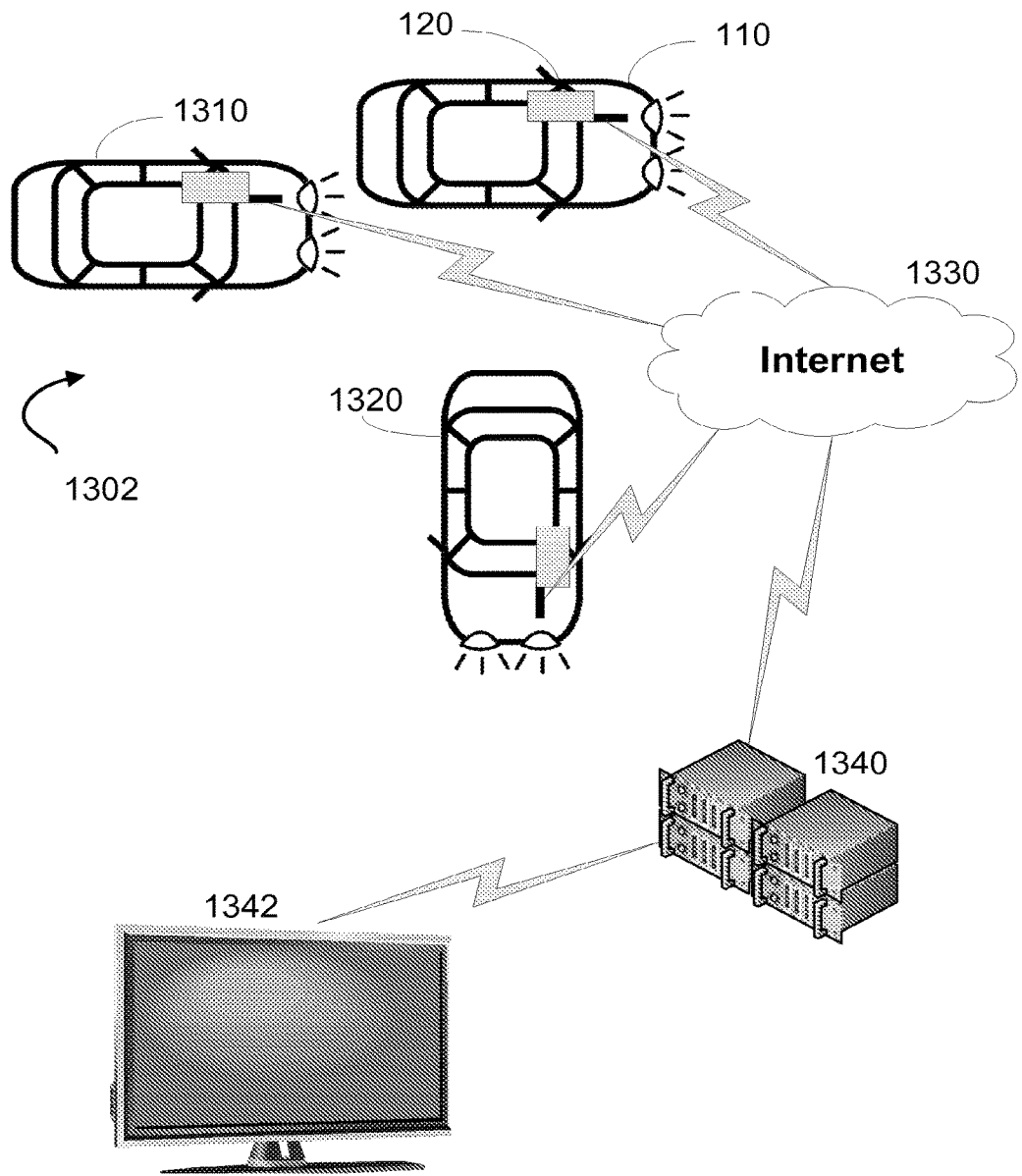
FIG. 13 is a scheme describing a system and process in accordance with an exemplary embodiment of the invention.

Examples of such reports are shown in 1260:

A report of vacant parking places: multiple cars such as 110 are driving through the city as shown in FIG. 13, in case a car comes across a vacant parking place, that spot is reported back through a public network to create the report.

A report of places in the road that require fixing such as 822, that can help the municipal authority fix them.

A report on businesses on the street, their names and block numbers (using OCR), the amount of traffic that passes next to them such as 832, the number of people inside or waiting outside of them. And the emotions of these people (using smile recognition and/or analyzing the sounds that crowd is making).

A report on the overall sentiment in certain city region.

A report on the overall status of cars in a certain region such as their models, are they old or new, do they have mechanical problems, what is the level of pollution they are making.

A report on the status of plants in the city, how many green regions are three, how many of them need irrigation (using IR), how many of them are blossoming.

A map of the city:

Roads using road recognition (for example many asphalt roads are black);

Buildings, using building recognition;

Street number of each of them using OCR of the street signs;

Traffic signs such as 816,824, 600 using content match to traffic sign DB, including changing signs such as LED signs;

A real time map of the Temperature on different parts of a region, such as a city temperature map;

A report on driver behavior, the data collected by device 120 using camera 122 and/or sensors 124, 126 such as: acceleration, speed, accidents, near accidents, collision warnings can all be collected to create a database of driver behavior. The specific driver can be identified using face recognition or by the identity of device 120. The data can be used to evaluate the risk of the specific driver making an accident and an overall risk scoring can be computed for that driver. The result can be the estimated cost of the diver is insurance risk and/or gas consumption to be used by the driver and/or his company and/or insurer.

A reported on wanted cars, for example each car such as 110, 1310, and 1320 carry system such as 490 using devices such as 120. In case system 490 identify a license plate of a neighboring car such as 130; it uses LPR to report the license plate to a remote server such as 1340. The remote server compares the found license plate to a wanted car database such as stolen cars, fugitives, and people with unpaid debt. In case match is found a system reaction is created such as an SMS to the local police station.

A report of places of interest, for example places where vehicles or people tend to slow down or even stop (that could be measured using GPS, acceleration, or the camera) are considered places that create higher level of interest.

FIG. 13 is a scheme describing a system and process in accordance with an exemplary embodiment of the invention.

The System is comprised of:

A fleet of platform such as 200, for example cars 110, 1310, 1320 where each of them carries devices such as 120. Platforms are connected via a public network such as wireless Internet 1330 to a remote server 1340. Servers processes the captured by 1302 such as shown in FIG. 5 or step 1230. Reports such as 1240, 1260 are shown using devices such as 120 or on a remote terminal such as 1342.

Figure 14A:
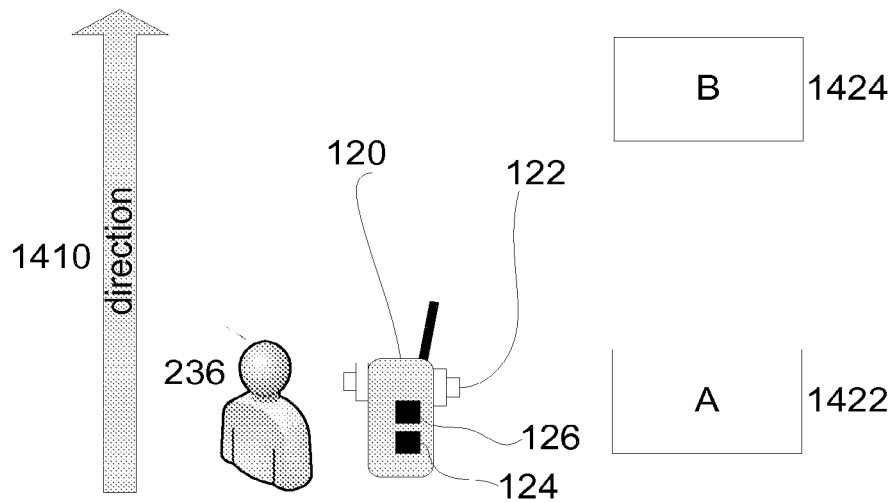
FIGS. 14A and 14B are a scheme describing a system and process in accordance with an exemplary embodiment of the invention.
Figure 14B:
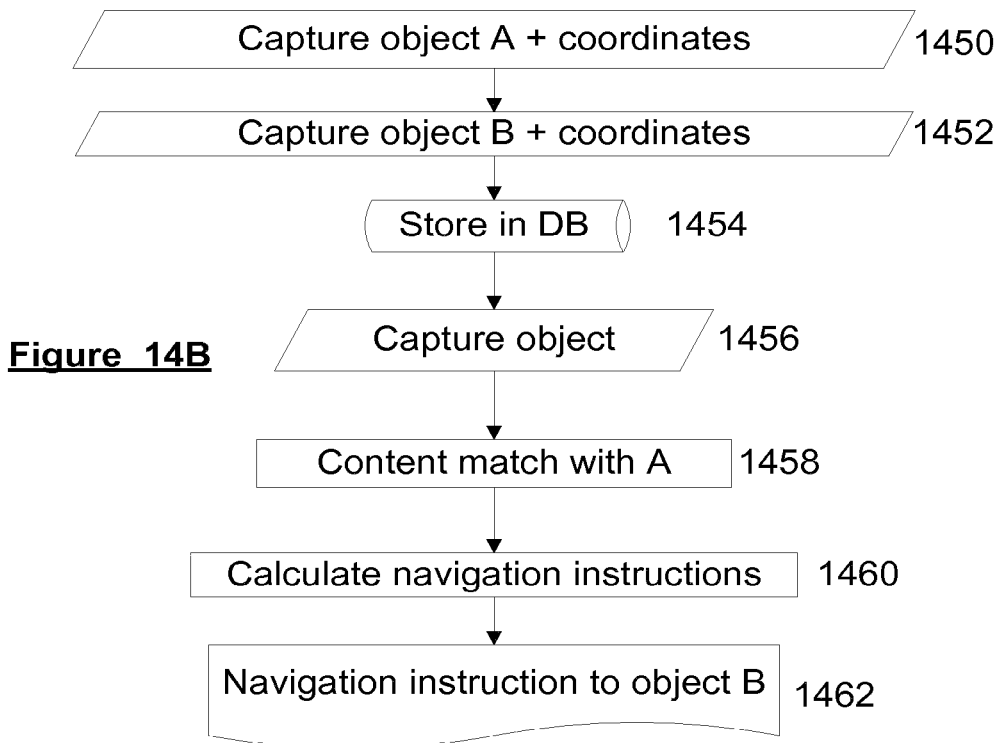

FIGS. 14A and 14B are schemes describing a system and process in accordance with an exemplary embodiment of the invention.

Object A and its coordinates are captured 1450 and its coordinates are recorder using systems such as a GPS. The same steps are performed on object B 1452 and data on both objects is stored 1454 in a DB.

Person 236 is moving in direction 1410 and passes by object a marked 1422 requests system such as 120 to get to object B or its coordinates. Device 120 uses sensors such as 122, 128,124,126 to capture information on object 1422 as described in step 1456. The Captured data on object 1422 is compared against the data in the DB of 1454 to search 1458 for a content match. In case content match is found with object A and using it coordinates navigation instructions are calculated 1460 using the coordinates of object B in relation to the coordinates of object A and displayed 1462 to person 236.

The system and process can be used for example to navigate in place where GPS usage is not possible such as between stores in a shopping mole, between shelves in a supermarket, and to find ones car in a parking lot for finding the right door in a an office place.

The system can be used for Micronavigation, for example to identify in case someone is navigating in the wrong lane, or took the wrong turn.

Figure 15:
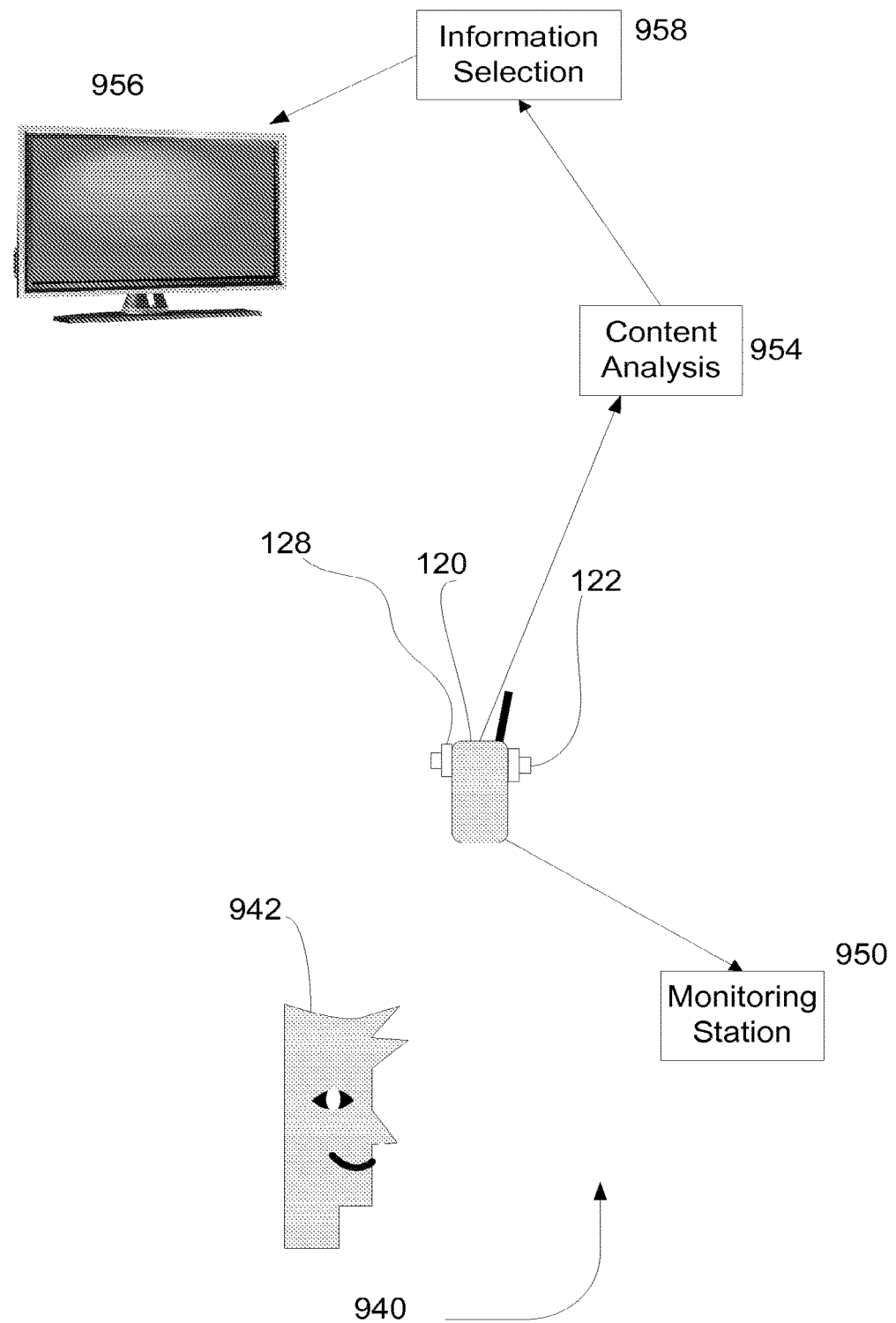
FIG. 15 is a schematic illustration of an information display system

FIG. 15 is a schematic illustration of an information display system 940, in accordance with an exemplary embodiment of the invention.

System 940 comprises a device 120 with cameras 122, 128 which acquires images, optionally a video stream of images. The images are provided to a content analysis unit 954 which identifies objects of interest in the images. Information on the identified objects and optionally their attributes is forwarded to an information selection unit 958 which determines accordingly what information is to be displayed on a display 956, using any of the above described methods.

In an exemplary embodiment of the invention device 120 may monitor people, such as person 942, standing near display 956 and select advertisements for display 956 according to attributes of the people. For example, advertisements directed to a child audience may be displayed when device 954 identifies a large percentage of children in the images acquired by device 120. Alternatively to being directed at a location from which display 956 is viewed, camera 952 may view an entrance to a shop or other closed area in which display 956 displays advertisements or other information. The advertisements displayed are optionally selected according to the average profile of people entering the shop.

In some embodiments of the invention, the advertisements are selected responsive to behavior against rules identified in the images of device 120. For example, when a camera monitoring a printer at a work place identifies misuse of the printer it may show on display 956 a warning and/or use instructions.

Device 120 is stationary, in some embodiments. In other embodiments of the invention, Device 120 is a portable camera, possibly mounted on a mobile communication terminal. In these embodiments, display 956 is optionally the display of the mobile terminal. Alternatively, display 956 is separate from the mobile terminal, which periodically transmits information selection instructions to the display. In some embodiments of the invention, Device 120 stores the selected information until the mobile terminal is connected to a base computer. Device 120 may also be mounted on home and/or office appliances, such as refrigerators.

In some embodiments of the invention, the images from device 120 are additionally provided to a monitoring station 950. Thus, device 120 is used for two different tasks and the cost of camera hardware is reduced. In some embodiments of the invention, installation of system 940 is financed by the advertisements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, an d applications are also within the scope of the invention. Accordingly, the scope of the invention should not be limited by what has thus far been described, but by the appended claims and their legal equivalents.

The invention claimed is:

1. A system comprising:
a plurality of image capture devices, each one of the plurality of image capture devices having an image capturing unit, a positioning unit, and a processing unit,
wherein one or more applications are executed on each of the plurality of image capture devices and wherein each one of the plurality of image capture devices is mounted to, or integrated in, a different one of a plurality of vehicles,
wherein each one of the plurality of image capture devices captures a sequence of images and extracts therefrom information about a plurality of surface objects located within a distance from a first vehicle in real-time, where said first vehicle is one of the plurality of vehicles, and
wherein, for each image capture device, the one or more applications executed on that image capture device instructs the respective processing unit to derive location data related to the plurality of surface objects based on positioning measurements derived from the positioning unit of that image capture device; and a server, connected to each one of the one or more applications via a wireless network, where the server receives the information and the location data of the plurality of surface objects transmitted by each one of the one or more applications, and generates a report in real-time, retrievable by a remote device in real-time, where said report is created according to an analysis of the information and the location data from the one or more applications, the report including a subset of the information and location data of said plurality of surface objects located within said distance from said first vehicle, received from the one or more applications, wherein the subset of information and location data belongs to one of a plurality of different categories, and wherein said report includes a status of said plurality of surface objects belonging to said one of said plurality of different categories.

2. The system according to claim 1, wherein, for each of the plurality of image capture devices, the processing unit of that image capture device is further configured to apply a decision function to the captured images and to momentary kinetics parameters, to yield an analysis of a risk of a collision between the first vehicle and a second vehicle, wherein the image capture device further comprises a front camera to capture images of a driver of the first vehicle, wherein the processing unit is adapted to process the images of the driver and to detect, accordingly, physical and cognitive conditions of the driver, and wherein the processing unit is further configured to estimate the risk based on the physical and cognitive conditions and instruct a display device included in or communicatively coupled to the image capture device to selectively display an alert based on the estimated risk.

3. The system according to claim 1, wherein, for each of the plurality of image capture devices, the processing unit of that image capture device is further configured to apply a decision function to the captured images and to momentary kinetics parameters, to yield an analysis of a risk of a collision between the first vehicle and a second vehicle, and wherein the processing unit is adapted to process the sequence of images and determine, accordingly, conditions of a road, wherein the processing unit is further configured to apply the decision function to the determined conditions of the road, to yield an improved estimation of the risk of collision.

4. The system according to claim 1, wherein, for each of the plurality of image capture devices, the processing unit of that image capture device is further configured to apply a decision function to the captured images and to momentary kinetics parameters, to yield an analysis of a risk of a collision between the first vehicle and a second vehicle, wherein the processing unit is adapted to process the sequence of images and detect, accordingly, pedestrians, and wherein the processing unit is further configured to apply the decision function to the detected pedestrians to yield an updated estimation of the risk of collision.

5. The system according to claim 1, wherein at least one of the plurality of image capture devices is further configured to consume electricity from a vehicle-mounted power source.

6. The system according to claim 1, wherein at least one of the plurality of image capture devices is mounted in a quick mount attached to a surface within one of the plurality of vehicles, the at least one quick mount unit comprising a quick release cradle on a first end and a suction cup at a second end.

7. The system according to claim 1, wherein said report maps vacant parking places detected in real-time by said extracting.

8. The system according to claim 1, wherein said report maps places in a road that are candidates to be fixed.

9. The system according to claim 1, wherein said report maps businesses on a street.

10. The system according to claim 1, wherein said report maps overall status of cars in a certain region.

11. The system according to claim 1, wherein said report maps status of plants in a city.

12. The system according to claim 1, wherein said report includes a map of a city that maps roads and buildings.

13. The system according to claim 1, wherein said report maps vehicles for sale within a range.

14. A method comprising:
executing at least one smart phone application installed in each of a plurality of smart phones, each having an image capturing unit, a positioning unit, and a processing unit, wherein all of the units are physically packed within a respective smart phone and wherein each of the plurality of smart phones is housed in or mounted to a different one of a plurality of vehicles;
capturing a sequence of images, by each of the plurality of smart phones;
extracting from the sequence of images information about a plurality of surface objects located within a distance from a first vehicle in real time, where said first vehicle is one of the plurality of vehicles;
deriving location data related to the plurality of surface objects based on positioning measurements derived from the positioning unit of each of said plurality of smart phones;
connecting to a remote server via a wireless network; and
transmitting the information and the location data of the plurality of surface objects to the remote server,
wherein the server generates a report, in real-time, accessible to each of the plurality of smart phones via the wireless network in real-time, said report comprising a map of a city according to an analysis of the information and the location data from the at least one smart phone application, the report including a subset of the information and location data of said plurality of surface objects located within said distance from said first vehicle, wherein the subset of information and location data belongs to one of a plurality of different categories, and wherein said report includes a status of said plurality of surface objects belonging to said one of said plurality of different categories.

15. The method according to claim 14, further comprising applying a decision function to the captured images and to momentary kinetics parameters to yield an analysis of a risk of a collision between the first vehicle and a second vehicle, determining physical and cognitive conditions of a driver of the first vehicle, and applying the decision function to the determined driver conditions to yield an updated estimation of the risk of collision.

16. The method according to claim 14, further comprising applying a decision function to the captured images and to momentary kinetics parameters to yield an analysis of a risk of a collision between the first vehicle and a second vehicle, processing the sequence of images and determining, accordingly, conditions of a road, and applying the decision function to the determined conditions of the road to yield an updated estimation of the risk of collision.

17. The method according to claim 14, further comprising applying a decision function to the captured images and to momentary kinetics parameters to yield an analysis of a risk of a collision between the first vehicle and a second vehicle, processing the sequence of images and detecting, accordingly, pedestrians on the captured images, and applying the decision function to the detected pedestrians on the captured images to yield an updated estimation of the risk of collision.

18. The method according to claim 14, wherein the at least one smart phone is further configured to consume electricity from a vehicle-mounted power source.

19. An image capture device mounted to or integrated in a first vehicle of a plurality of vehicles, the image capture device comprising:
   an image capturing unit;
   a positioning unit; and
   a processor, wherein the processor executes one or more applications that, when executed, cause the image capture device to:
      capture a sequence of images and to extract therefrom information about a plurality of surface objects located within a distance from the first vehicle of the plurality of vehicles, in real time,
      derive location data related to the plurality of surface objects based on positioning measurements received from the positioning unit,
      connect to a remote server via a wireless network,
      transmit the information and the location data of the plurality of surface objects to the remote server for generation of a real-time report, and
      access and display the report received in real-time from the remote server, wherein the report comprises a map of a city generated at the remote server according to an analysis of the information and the location data received by the remote server from the image capture device and information and location data received by the remote server from a plurality of other image capture devices, each mounted to or integrated in a different one of the plurality of vehicles, and wherein the report includes a subset of the information and location data of said plurality of surface objects located within said distance from said first vehicle, the subset of information and location data belonging to one of a plurality of different categories, and wherein said report includes a status of said plurality of surface objects belonging to said one of said plurality of different categories.

20. The image capture device of claim 19, wherein the processor is further configured to execute the one or more applications to generate an alert responsive to the report based on a location of the first vehicle.

* * * * *